United States Patent
Navoni et al.

(10) Patent No.: US 7,036,130 B2
(45) Date of Patent: Apr. 25, 2006

(54) METHOD FOR EXPANDING IN FRIENDLY MANNER THE FUNCTIONALITY OF A PORTABLE ELECTRONIC DEVICE AND CORRESPONDING PORTABLE ELECTRONIC DEVICE

(75) Inventors: Loris Giuseppe Navoni, Cernusco sul Naviglio (IT); Michele Borgatti, Finale Emila (IT); Lorenzo Cali', Monza (IT); Pierluigi Rolandi, Monleale (IT)

(73) Assignee: STMicroelectronics S.r.l., (IT)

( * ) Notice: Subject to any disclaimer, the term of this patent is extended or adjusted under 35 U.S.C. 154(b) by 663 days.

(21) Appl. No.: 10/035,542

(22) Filed: Dec. 28, 2001

(65) Prior Publication Data

US 2002/0147859 A1 Oct. 10, 2002

(30) Foreign Application Priority Data

Dec. 29, 2000 (EP) .................................. 00830873

(51) Int. Cl.
*G06F 3/00* (2006.01)
*G06F 9/44* (2006.01)
*G06F 9/46* (2006.01)
*G06F 13/00* (2006.01)

(52) U.S. Cl. ........................... 719/328; 719/332; 713/1

(58) Field of Classification Search .................... 713/1, 713/2, 100; 710/8, 10, 14, 104; 719/328–332, 719/310–320
See application file for complete search history.

(56) References Cited

U.S. PATENT DOCUMENTS

| 4,908,792 | A |   | 3/1990 | Przybyla et al. ............ 364/900 |
| 5,133,076 | A |   | 7/1992 | Hawkins et al. ............ 395/800 |
| 5,157,384 | A | * | 10/1992 | Greanias et al. ............ 345/156 |
| 5,161,102 | A | * | 11/1992 | Griffin et al. ................ 710/104 |
| 5,418,960 | A | * | 5/1995 | Munroe ......................... 713/1 |
| 5,432,938 | A |   | 7/1995 | Ohashi ........................ 395/700 |
| 5,602,963 | A |   | 2/1997 | Bissonnette et al. ........ 395/2.84 |
| 5,659,665 | A | * | 8/1997 | Whelpley, Jr. .............. 704/275 |
| 5,668,992 | A | * | 9/1997 | Hammer et al. ................ 713/1 |
| 5,815,706 | A |   | 9/1998 | Stewart et al. .............. 395/652 |
| 5,822,565 | A | * | 10/1998 | DeRosa et al. ................ 703/24 |
| 6,023,736 | A | * | 2/2000 | Lambeth et al. .............. 710/10 |

(Continued)

FOREIGN PATENT DOCUMENTS

EP 0 945 792 A2 9/1999

OTHER PUBLICATIONS

Silverio, et al.; "The Merlin Communications System"; *IEEE Journal on Selected Areas in Communications*, vol. SAC-3, No. 4, Jul. 1985, pp. 584-593.

(Continued)

*Primary Examiner*—William Thomson
*Assistant Examiner*—Diem Cao
(74) *Attorney, Agent, or Firm*—Jenkens & Gilchrist, PC

(57) ABSTRACT

The invention relates to a method of expanding the functional capabilities of portable electronic devices with user friendly modes, wherein a host device is associated a quick-connect function-expanding module. In this method, at each installation of a given module, the functional expansion module and the host device recognize each other; on first installation of a given module in the host device, a series of checking operations are carried out automatically; the user can select to activate the available expansion; and once a given application is selected, the configuration and functions required for each application are stored.

8 Claims, 3 Drawing Sheets

U.S. PATENT DOCUMENTS

| | | | | |
|---|---|---|---|---|
| 6,055,595 A | * | 4/2000 | Tachibana et al. | 710/301 |
| 6,061,651 A | | 5/2000 | Nguyen | 704/233 |
| 6,189,050 B1 | * | 2/2001 | Sakarda | 710/18 |
| 6,192,255 B1 | * | 2/2001 | Lewis et al. | 455/558 |
| 6,192,343 B1 | * | 2/2001 | Morgan et al. | 704/275 |
| 6,636,901 B1 | * | 10/2003 | Sudhakaran et al. | 719/327 |
| 6,718,319 B1 | * | 4/2004 | Fisher et al. | 707/1 |
| 6,816,837 B1 | * | 11/2004 | Davis | 704/275 |
| 2002/0077829 A1 | * | 6/2002 | Brennan et al. | 704/275 |

OTHER PUBLICATIONS

Borgatti, et al.; U.S. Appl. No. 10/036,185, Filed Dec. 28, 2001.

* cited by examiner

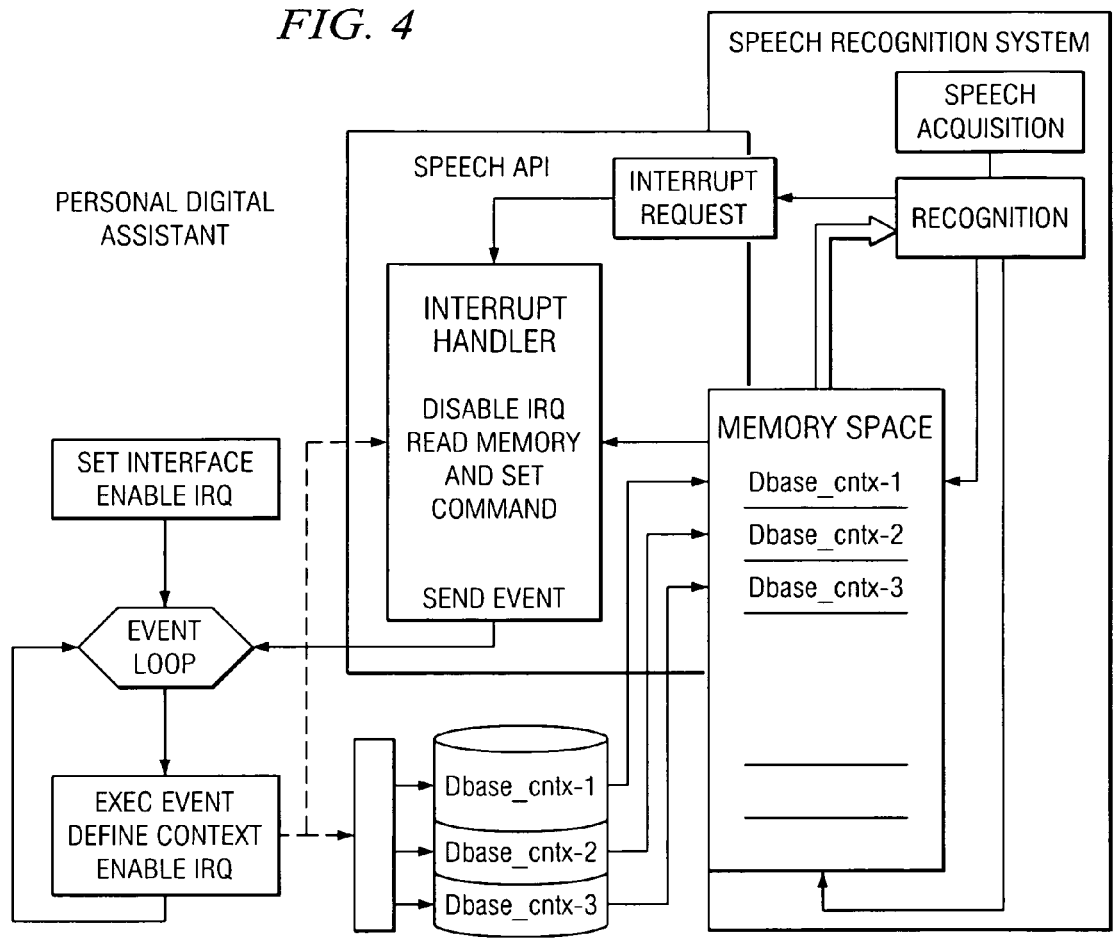

METHOD FOR EXPANDING IN FRIENDLY MANNER THE FUNCTIONALITY OF A PORTABLE ELECTRONIC DEVICE AND CORRESPONDING PORTABLE ELECTRONIC DEVICE

BACKGROUND OF THE INVENTION

1. Technical Field of the Invention

The present invention relates to a method of expanding the functional capabilities of portable electronic devices with user friendly modes, of the type in which a host device is associated a quick-connect functional expansion module.

The invention further relates to a portable electronic device having expanded functions in a user friendly mode.

2. Description of the Related Art

As is well known, developments in electronic computing devices have led to consolidation in a small space a number of functions that were afforded in the past only by desk computers. Many functions, e.g. diary, calculation, communication, scheduling functions, are now offered by a number of appliances (e.g., palm and hand-held computers, mobile phones, organizers) designed for operation while held in one's hand.

With palm-top devices, data and/or commands to execute operations sought by a user are entered by depressing keys or through a touch screen.

A nontrivial consideration in the design of palm-top devices is the interfacing with the user. For the available functions to be readily set to work by the user, it is necessary that the user be enabled to grasp the essentials for function activation without having to go through lengthy training sessions. This is because, unlike standard computers, these devices are often utilized to interact with a distracted user, as may be the case of a cellular phone being operated in a crowded railway station, or are required to respond promptly, as when voice or written notes are to be entered. Having to allow some minutes for the system/device to re-initialize, as is often necessary with desk-top computers, would be undesirable.

In this context, to be able to call an application or to enter a sequence of data by voice messages would make such palm-top devices quicker and more convenient to use.

A prior approach is disclosed in U.S. Pat. No. 5,602,963, where a so-called personal organizer is described that can be commanded by voice.

Another voice-commanded device is disclosed in U.S. Pat. No. 6,061,651, wherein a system is activated upon recognition of a vocal pulse above a given threshold.

To ease function activation and control, the industry of palm-top electronic devices had pursued expansion of the functions of a generic support system that affords a number of discrete functions within a limited area. However, a user's requirement is that any added functions should be readily identifiable, quick to install, and operable at will with little to no overlap of the support system.

An approach that attempts to fill these demands is disclosed in U.S. Pat. No. 5,133,076, which provides an expansion module for a palm-top computer.

Another prior approach is U.S. Pat. No. 5,432,938, which provides a method of automatically activating a functional expansion module by insertion into a computer unit.

Based upon the foregoing, there is a need for a hand-held or otherwise portable system which allows a user relatively quick access to and easy control of a variety of functions.

SUMMARY OF THE INVENTION

Embodiments of the present invention are directed to provide a method of managing supplementary modules to a palm-top type of base device. In particular, embodiments of the present invention provide a method of implementing additional functions within a support system, specifically within a palm-top electronic device, with features appropriate to make predetermined applications, not originally provided in the support system, quick to set up and use, for improved system applicability and user satisfaction.

The embodiments of the present invention divide these capabilities between a series of sub-features addressing the interfacing of a support system to an added module effectively supplementing the system with additional functional capabilities. The sub-features include the capability to recognize existing applications in the basic reference device; check an additional function of the supplementary module for compatibility with the existing applications; find the class of commands to which the additional function is to be assigned; interact with the user to acquire necessary information to the additional function; set up the system for receiving and interpreting the additional function; and hold the setup stored in memory, and retrieve the stored setup each time that the base device and supplementary module are turned on.

The features and advantages of the method and device according to embodiments of this invention will be apparent from the following detailed description of an embodiment thereof, given by way of non-limitative example with reference to the accompanying drawings.

BRIEF DESCRIPTION OF THE DRAWINGS

FIG. 4 is a schematic flow chart for an exemplary application.

FIG. 5 is a table illustrating the match of a command instruction to a corresponding action of a given application, as is made possible by the module shown in FIG. 3.

DETAILED DESCRIPTION OF THE INVENTION

The present invention will now be described more fully hereinafter with reference to the accompanying drawings in which exemplary embodiments of the invention are shown. This invention may, however, be embodied in many different forms and should not be construed as being limited to the embodiments set forth herein. Rather, the embodiments are provided so that this disclosure will be thorough and complete, and will fully convey the scope of the invention to those skilled in the art.

Figure 1:
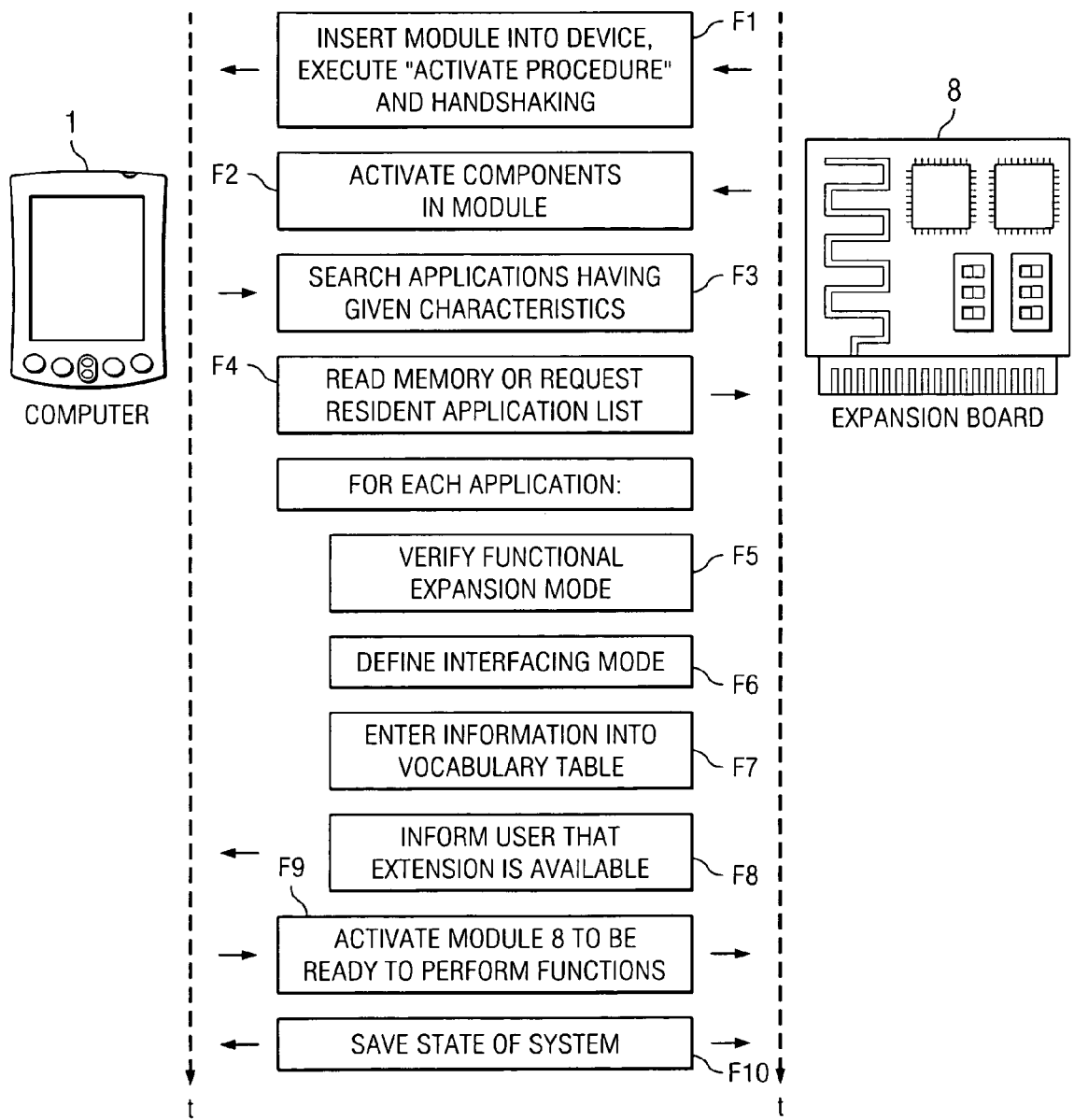
FIG. 1 is a schematic flow chart for the method of interfacing a host electronic device to a module in order to expand the functional capabilities of the host device, according to an embodiment of the invention.

With reference to the drawings, in particular to the example shown in FIG. 1, a portable, e.g. palm-top, type of host electronic device operated in accordance with the inventive method is shown generally at 1 in schematic form. The device 1 may be a wrist organizer, a cellular phone, or a palm-top computer, such as the "Visor" model by Handspring, in which the OS operating system is installed. It is understood that device 1 may be virtually any type of portable or hand-held electronic device that can be manipulated by a user.

Figure 2:
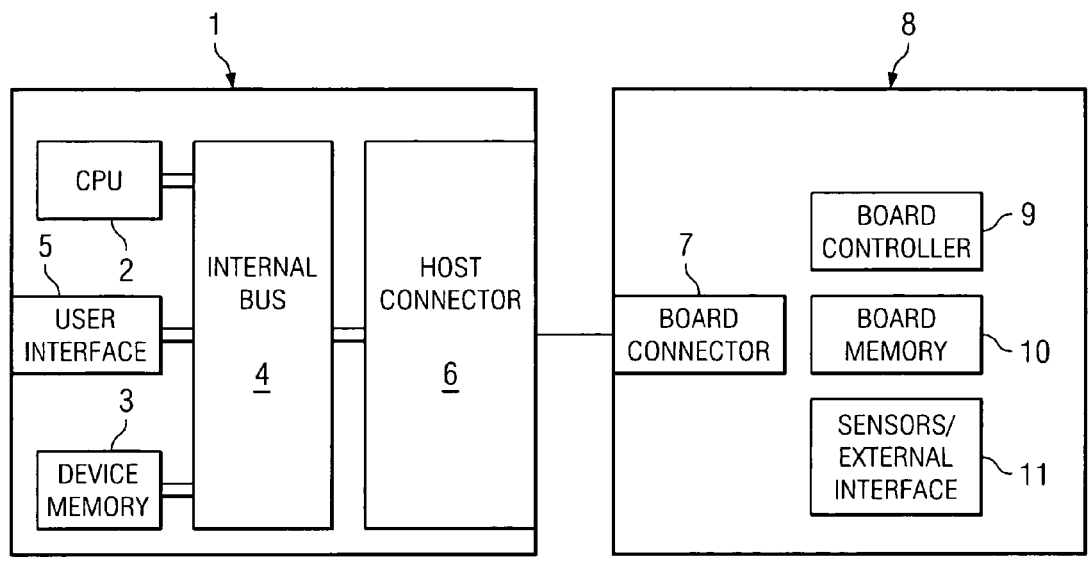
FIG. 2 is a block diagram showing schematically the construction of the host electronic device and that of the expansion module.

The device 1 may include a microprocessor 2 and a memory unit 3, as shown in FIG. 2. These internal components may be interconnected by an internal bus 4, which may also connect to a user interface 5. The device 1 may further include a connector 6 adapted for quick engagement with a mating connector 7 on a separate module 8.

The module 8 may be an expansion board adapted to expand the functions of the device 1, and adapted for releasable connection to the device 1 by plugging the connectors 6 and 7 together. The module 8 may include at least a microcontroller 9 and a memory 10. Ambient interface sensors 11 may be also provided in module 8. Components 9, 10 and 11 may be interconnected by an internal bus of the module 8, which bus may be provided by printed circuit tracks of the expansion board.

To explain the various aspects of this invention, the device 1 will be described below to be a generic palm-top computer, for exemplary purposes only. The expansion board 15 will then be described as a module adapting the device 1 for vocal command acceptation. It is understood that device 1 may be an electronic device other than a palm-top computer, and that expansion board 15 may provide other functions to device 1 in addition to or instead of vocal command acceptation.

With these assumptions, and according to the flow chart of FIG. 2, the vocal command function is activated by just inserting the specially provided board 15 of module 8 into the expansion slot of device 1. This board 15 is able to independently discriminate those applications resident to device 1 which match its functional capabilities, to set up the system for acceptance of vocal commands and control the palm-top computer applications consistently with the vocal commands imparted, without the user being required to do any setting up.

Also, the configuration and current state can be held in store for prompter system setting up upon the board being inserted on any later occasions. By removing the above board 15 and inserting another providing different functions, e.g. feature recognition, the palm-top computer may be re-configured in conformity the newly inserted board.

The method, according to the exemplary embodiment of this invention, may include at least one expansion module 8 serving a function of choice, complete with components the functional expansion module 8 may require (power supply, sensors, etc.). Module 8 can be connected to a generic portable host device 1 through an interface 6, 7 having a definite protocol. The module 8 may be effective to expand the functions and potential of the device 1.

In addition, the device 1 and module 8 may form an interconnected whole adapted, through its software and hardware components, to: acquire external prompts to perform its functions; convert the prompts, and respond to the prompts by activating operations; later send consistent signals according to protocols that are compatible with the computational system of the host devices 1; self-activate, and install the software upon plugging into, and remove the software upon unplugging from, the host device 1; be independent of the existing applications; be independent of the existing hardware; and provide a physical connection between the module 8 and the host device 1 by way of their respective physical interfaces 6, 7.

In the case of the above-mentioned exemplary voice command functionality, a system including a vocal command module connected to a palm-top computer may perform acquiring audio sequences that contain voice messages; and upon recognizing a voice message, issuing the host device one or more codes of the communication protocol established between the two devices, according to the vocal command imparted.

The method of the exemplary embodiment of the invention includes a sequence of steps, listed herein below in terms of interface protocol between the host device 1 and the expansion module 8. In particular, the method may include the functional expansion module 8 and the host device 1 recognizing each other, at every installation or connection therebetween. In addition, the method may include, upon installing the module 8 in the host device 1 for the first time, substantially automatically listing the applications that are resident in the host device;

checking for applicability of the expansion to each application (e.g., an administrative type of program would require no audio expansion);

searching out, for each resident application, the modes that need to be used to implement the expansion (e.g., listing commands that can be extended, or implementing fresh resources), and possible user interfaces, which may be carried out on calling an application for the first time; and searching out or constructing a "vocabulary" of correspondence between the minimum of functions afforded by the expansion device 8 and the minimum of functions demanded by the application in the host device 1.

The user may be allowed to activate the available expansion. When a selection is provided, for a given application, the method may include:

finding out the components of the "vocabulary of functions" from the sets associated with the other applications involved in the extension that is made possible by the supplementary module;

optionally requesting for training, or for a check in the vocabulary entered;

warning the user of the expansion being available, using a video or audio signal; and activating the expansion on request by the user.

Information may be stored in the system, such as the configuration characteristics, the "vocabularies of functions" for each application, and the current state of each activated application.

Each step of the method according to the exemplary embodiment of the present invention will now be described in detail. Initially, it is assumed a starting state in which the expansion module 8 is plugged into or quick connected to the host device 1 so as to form a whole or unitary device.

The plugging in action, Step F1 in FIG. 1, activates an "activate" procedure in the operating system of the host device 1, by reading a (high/low) logic signal from predetermined pins of the connected module 8. This logic signal will activate a portion of the operating system to check for the presence of any programs and/or applications in a pre-set memory space reserved for expansion boards.

For example, in the Handspring Visor palm-top computer, using the Palm OS operating system, there are two signals to indicate connection of an expansion board and perform two functions: entering an interrupt to the palm-top computer to warn the CPU of the connection made, and activating the power supply to the board for its operation.

At the same time as the application is activated by the operating system of the host device 1 (Step F2), the components inside the expansion module 8 may be also activated, and are now ready to implement the application.

In the context of the above example, the operating system may, upon insertion of the module 8 or the board 15, search out an application having given characteristics in the memory space reserved for the board 15 (Step F3). If such an application does exist, the current execution is interrupted and the board application is executed instead. The application would contain the necessary procedures to activate the board components and set them for use by the palm-top computer device 1.

The presently active application may either start reading from the memory space in the host computer 1, or request from the host operating system a list of the applications that are resident in the host device 1, as specified under Step F4 in FIG. 1. A list of the resources associated with each available application can thus be obtained (graphic objects such as forms, buttons, etc.), and the items of information that the expanded application can utilize be derived. Steps F5 and F6 are exemplary of operations directed to verify the functional expansion mode and define the mode of interfacing the module 8 to the device 1, respectively.

For example, when a form is identified which carries a heed message ("Wish to confirm the operation?"), and a possible confirmation ("OK"), a voice synthesizing system acquires the information provided by the contents of the message, and a vocal command system acquires the information about the confirmation to be given. These items of information will be entered in a table, herein referred to as the "vocabulary" of correspondence between the resources used by the application and the operations demanded of the extension module 8, Step F7.

Furthermore, some software algorithms will have to be set up which would detain requests from the operating system and once again send the request for action to the extension module 8, or conversely detain an action by the extension module 8 and notify the operational system of the action performed as if the latter had been executed by a "proprietary" software portion.

After checking with all the applications that are present in the system (Steps F5, F6 and F7) and creating a table of correspondence for each application whose functions can be "expanded" by the installed module, the system will be as specified here below.

The expansion module 8 may include a load-and-connect program for loading into and connecting to the host system 1; an expansion board checking program; and an API (Application Programming Interface) for the board 15 to dialog with the operating system of the host device 1.

The host device 1 may include tables of correspondence between the applications and the commands from the installed device; and an operational system patch or path for detaining the functions to be expanded. A message or a light indication on the board 15, or alternatively a symbol appended to the application symbol on the main page, may inform the user that the extension is available, Step F8. Once a program affected by the expansion is activated, the module 8 connected to the portable device 1 may be activated to make it ready to perform the functions requested, Step F9.

On completion of the application, or upon the board 15 and/or the module 8 -being removed, certain operations will be performed to save the current state of the system, so that the application can be restored immediately upon the board 15 being inserted back into device 1 and the information about the vocabularies of correspondence can be saved, Step F10.

The modes of connecting and operating a speech recognition module 8 will now be discussed, by way of example only, which module 8 would be associated with a Handspring Visor model of palm-top computer in which a Palm OS™ operating system is installed, and which can accommodate additional-function boards 15 by means of a mechanical/electrical connection (springboard expansion slot) that is physically identical with a PCMCIA connection located on the backside of the device 1.

The following are among the signals that best characterize this connection between the board 15 and the device 1:

CD1, CD2—Module Detects: these are connection detectors indicating to the palm-top computer that a board 15 has been inserted into the expansion slot;

CS0, CS1—Chip Selects: these control access to the two addressable regions that the expansion board 15 can use; and IRQ—Interrupt Request: a signal that issues from the board when services are requested of the palm-top computer device 1.

Available for use with the expansion module 8/device 15 may be an API (Application Programming Interface) that enables operation on the host operating system of the subject computer. This API may be effective to manage the board installation, activation of any resident applications, and events originated by the board.

Figure 3:
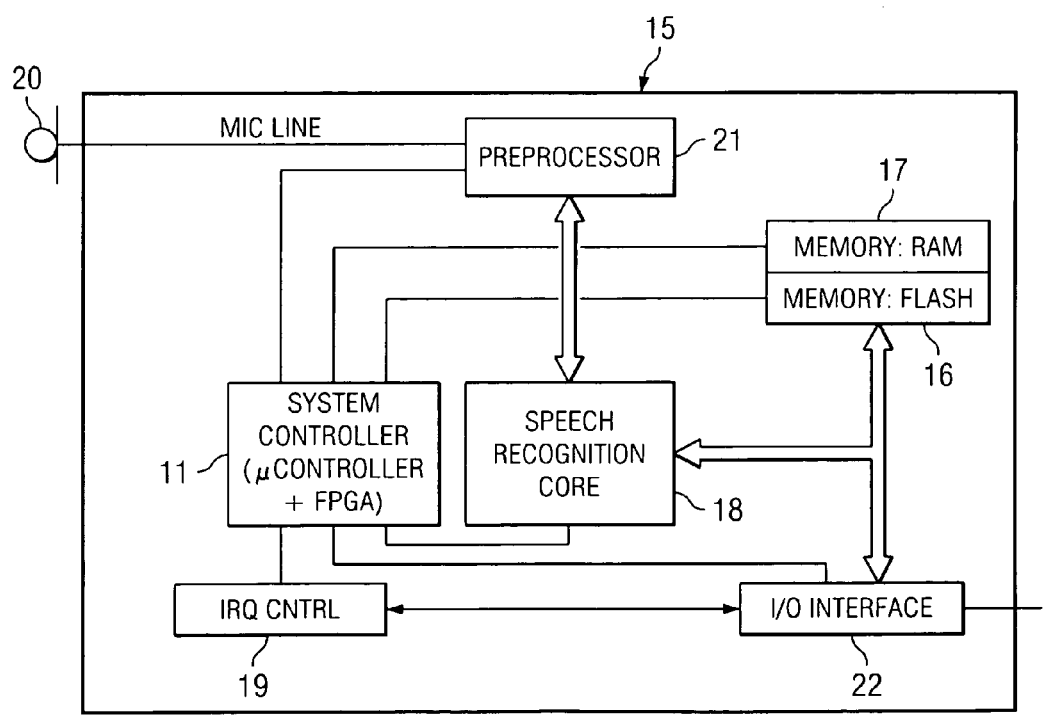
FIG. 3 schematically details the construction of a module associated with a host electronic device.

Assume, for exemplary purposes, a voice recognition board 15 that can run the recognition steps by itself and is provided with a compatible connection with the above palm-top computer 1. Referring to FIG. 3, this board 15 may include: a non-volatile memory 16, such as a flash type, containing the board set-up programs and the necessary APIs for dialog with the host computer 1; stored in a database may be voice features and optional tables of correspondence for the principal applications; a volatile working memory 17, such as a RAM; a speech recognition core unit 18; an interrupt control block 19; a data acquisition unit, such as a microphone line 20 and associated preprocessor 21; and I/O interfacing devices 12 (USB, 12C).

Stored in the resident non-volatile memory 16 of the board 15 may be substantially all the voice recognition activating procedures, which may be activated and made available upon inserting the board 15 into the expansion slot. The activating procedures may include: an FPGA loading and activating procedure, in order to set up the connections and protocols between the computer 1 and the board 15; a voice recognition system activating procedure to set up the system, by placing it in a standby state, and activate the system as requested; an interrupt managing procedure to read the tables of correspondence between the voice commands and the software actions, and activate these actions; and a control procedure effective to manage the above software components and guide their respective activation through the various steps.

Consider, for example, the Palm OS™ operating system that is resident in the palm-top computer. This operating system is host to several applications. Using suitable software modules, its characteristics related to the user interface can be extracted for each application held in the computer. These characteristics can be represented by their associated resource modules. Resources modules hear those software portions that are preset by the operating system and interact with the user through the input/output units.

Given below is an example of an application resource:

```
......
FORM ID MainForm AT (0 0 160 160)
USABLE
MODAL
BEGIN
    TITLE "Voice Commander"
    LABEL "Ready to receive Vocal Commands" ID MainLabel AT (CENTER 16)
    BUTTON "Exchange Data" ID MainButton AT (40 30 80 40) USABLE
    FIELD ID MainResultField AT (65 100 29 16) USABLE SINGLELINE
END
......
ALERT ID RomIncompatibleAlert
CONFIRMATION
BEGIN
    TITLE "RomIncompatibleAlert"
    BUTTONS "OK"
END
```

Using a suitable instruction sequence, the above resources are detained by the program that is to set the table of correspondence for the voice recognizer. Those resources that can be supplied a corresponding vocal command (in the above example, these are the resources designated BUTTONS, in other cases, these may be elements in a list) are then identified. According to resource type, a patch of needed software functions to emulate the resource is constructed, and an item in the table of specific correspondence of the current application is created which would encompass the construction of each resource.

FIG. 5 illustrates this kind of match in table form.

Upon inserting the board, the following actions may take place in the expansion slot of the palm-top computer. Once the module detect signals (CD1, CD2) that attest of the insertion are detained, the Palm OS™ operating system searches the first block (identified by signal CS0) for availability of a memory space that is reserved for the expansion board, and searches for the presence of any applications. After finding out an application concerning the word recognizer setup, the operating system may copy that application into the internal memory, and executes its contents. A search may be also started among the resident applications to find out those having a table of correspondence already available. According to the configuration of given parameters effected by the user, the system may now be able to scan the other applications to make them available for guiding by vocal commands, initializing fresh tables of correspondence. To activate an application, the system may generate an activation request to the expansion module, supply pertinent data. The module may also set up to receive a vocal command.

If the command is recognized, the module 8 may return to the system the index (in the table of correspondence) of the word that has been recognized. The detention algorithm may then produce commands as appropriate to the context of the current application. If another application is called, the databases associated with the preceding application are closed, with the state of the preceding application being optionally saved, and the procedure is resumed from activating the application as described above.

In the instance of a module 8 that is designed to expand the functions of a basic electronic device 1 in terms of vocal command acquisition, a range of possible sceneries for the implementation of an interface between the module 8 and the device 15 are discussed here below by way of examples only.

Consider a module 8 that is attached to a generic portable device 1 and contains a series of standard applications not to be modified by the user. Assume, moreover, a group of modifiable applications, i.e. suitable applications for expansion. A software interface may include the acquisition of a database of necessary commands to the expansion; a connection channel to the device 1; and an acquisition system.

A review of a number of terms may be useful to make the aspects of the embodiments of the present invention more clearly understood, as they appear in this exemplary application.

A "context", in the portable device environment, encompasses what the user is able to perceive, such as display icons, LEDs, or other signals, and the group of commands that are available at the time, whether vocal commands or commands of a different nature, together with a respective group of feasible actions. A "microcontext" means a state of the application present in the context, within which only some of the actions in the group provided are feasible. A "feedback" means executing a command, for example, in the event of the message being rejected or not recognized by the device (as well as of a message being returned which is not included in the database or is inconsistent with the current microcontext), no actions would be executed. "Grammar" means the body of commands available for the applications. An active grammar is a sub-set of necessary commands in a given context, and comprises a group of general (noncontextual) commands and a group of specific commands for a given application. These groups of commands are contained in a database, as explained herein below under the heading Scenery 1.

Scenery 1: Guided acquisition of databases to the voice recognizer.

An noncontextual database exists that includes the commands shared by all the applications. For example:

[ok, new, details, cancel, delete, note, graffiti, next, back, show, priority, exit, etc.].

Some databases exist that are shared by some applications. For example, numerical: (calc, calendar, clock, etc.)

[0, 1, 2, . . . , 10, 11, 12]

edit:

[undo, cut, copy, paste, select, keyboard]

When the principal applications are taken into account, there may be approximately ten contexts, each having a group of at least twenty vocal commands.

Database acquisition flow

Acquisition_db (application_name)

```
{
    db_name = get_dbase_from(application_name);
    if does not exist db_name
    {
        db_name = create_db(application_name);
    }
    open_db(db_name);
    set_of_commands=define_commands(application_name);
    for each element of set_of_commands {
        err = request_acq_word (element);
        while(!err)err=request_acq_word (element);
    }
}
```

Scenery 2: Adaptation to the speaker

Consider a pre-existing database. It is possible to activate or de-activate an on-line acquisition mode. With a command issued, the following situations may appear: recognition occurs, the last command is stored another command is received and recognized, and if the on-line acquisition mode is active and the last command is confirming the preceding one (e.g., is neither a cancel nor an exit command), then the stored command is acquired to the database.

Scenery 3: Production of a database for a context, optionally by extracting data from different contexts This is a method of interfacing to the software application that may or may not employ voice recognition, and in which: on first installation of the application, the interfacing mode required by the application, and the "vocabulary of commands" that goes with it, are declared automatically; the user is enabled to select the interfacing mode; if the vocal command is selected, then the components of the "vocabulary of commands" in the set of vocal commands that pertain to the other voice-activatable applications are located, and a request is optionally passed for training in the vocabulary entered.

Vocabulary of commands is a database that is tied to an application (e.g., by a consistent name) and contains a set of commands that are specific to that application and already exist or are generated by a vocal command acquiring step. Integration to the database construction can be obtained (on first installation) by deriving, from the other existing databases, the individual commands of the same type and performing an off-line acquisition. For the rest of them, the user would be requested a normal acquisition (see Scenery 1).

The voice messages that correspond to the requested commands may be de-correlated from a linguistic standpoint, unless they lose their semantic significance by the user. For example, if the user chooses to interpret the commands by a different language from that of the device system, he/she can do so on condition that consistency be maintained between the voice message and the requested command. For example, requested command: "OK"→spoken: "va bene"

requested command: "SHOW"→spoken: "mostra".

In all cases, the equivocating (different words conveying the same notion), faltering pronunciation, and discriminating (words having different meanings but the same pronunciation) characteristics of speech should be taken into account in choosing the vocal commands.

Scenery 4: A sequence collecting information about an application and the acquisition of vocal commands (connected with Scenery 3) and subsequent patch to the operating system in order to synchronize the vocal commands to the application. The system will be able to: display a list of applications in the palm-top computer that have no corresponding vocal command database; allow selecting an application from the list; acquire the application resources, which include inter alia the list of commands to be input by voice; and construct a training database, dependent on the application and containing the vocal command list, like in Scenery 1. The patch program of the operating system may be able to: retrieve the identification of the application requested by the user; find the dbase that pertains to the application; and detain the information from the voice recognition system and produce equivalent events for queuing to the events handled by the current application.

Scenery 5: Activation of the operating system patch upon calling a generic application.

The system should be able to detain the request to activate an application, and through a program may: verify that the activated application can be guided by vocal commands; if necessary, request that a database be generated for activation by vocal commands; provide the recognition device with the addresses of the databases (contextual and noncontextual) linked to the application; activate the recognition device (place it in a standby state awaiting commands); and start the application.

Database:

The database may contain the "vocabulary of commands" associated with a context or set of contexts. There may be a database for each context. Univocal correspondence may exist between the database in the palm-top computer and the in: database associated with the same context but contained in the recognition device. The database may include:

a "completed" flag, indicating that the whole set of commands is acquired;

optionally, a list of the contexts encompassed by the database;

an on-line acquisition mode flag, indicating whether the database is enabled to on-line acquire fresh voice messages corresponding to the commands it contains;

indications about the corresponding database in the recognition database (starting address, ending address); and a list of specific controls to the application considered, or the class of actions shared by different contexts, to show the name of the requested command (label); the presence of the recognizer in the database; and a corresponding sequence of actions (commands to be effected by the operating system in order to execute the requested command).

FIG. 4 shows schematically an exemplary application flow, including communication channels and flags; enabling recognition, which verifies the state of the recognition device, identifies the context, and activates the acquisition and recognition enable flag for the device. A stacked command sequences store the sequence of the commands executed last, and allow tracing them; and allow optional on-line acquisition. A recognition acknowledge flag may be included.

Data addressing may include:

↑/↓ location of the contextual database

↑/↓ location of the uncontextual databases

↑/↓ address of the recognized word, or membership class

↑/↓ address of the range of words that belong to one class.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method for interconnecting a functional expansion module to a portable electronic host device, comprising:
    detecting interconnection of the functional expansion module to the portable electronic host device;
    checking if the portable electronic host device has previously stored data relating to necessary procedures for activating that functional expansion module and setting that functional expansion module to act as an expanded user interface for the portable electronic host device;
    if so, implementing the previously stored data for activating and setting;
    if not, interfacing for communication between the functional expansion module and the portable electronic host device to determine the necessary procedures, wherein interfacing comprises:
        identifying applications resident on the portable electronic host device;
        checking whether an expansion user interface functionality provided by the functional expansion module is applicable to one or more of the host device applications;
        searching, with respect to each applicable host device application, for modes and user interfaces needed for use in implementing the expansion functionality through that application; and
        defining a vocabulary of correspondence between a minimum of expanded user interface functions provided by the functional expansion module and a minimum of user interface functions demanded by the host device; and
    storing those necessary procedures by the portable electronic host device for subsequent use in connection with a later detected interconnection of that functional expansion module so as to obviate the need to interface at each detected interconnection in order to set that functional expansion module for use by the portable electronic host device.

2. The method of claim 1 wherein the necessary procedures comprise certain procedures implemented in order to activate the functional expansion module and set up the function expansion module for use in cooperation with the host device.

3. The method of claim 1 wherein the modes needed for use comprise listing user interface commands for resident applications that can be extended to the expanded user interface operation of the functional expansion module.

4. The method of claim 1 wherein the modes needed for use comprise the implementation of fresh resources by the host device to support operation of the functional expansion module.

5. Apparatus, comprising:
    a functional expansion module; and
    a portable electronic host device including:
        a processor that is operable to respond to a detected interconnection of the functional expansion module to the portable electronic host device by checking if the portable electronic host device has previously stored data relating to necessary procedures for activating that functional expansion module and setting that functional expansion module to act as an expanded user interface for the portable electronic host device, that previously stored data for activating and setting implemented if present;
        an interface for communication between the functional expansion module and the portable electronic host device to determine the necessary procedures, if the data for activating and setting is not present,
    the processor further operating to:
        identify applications resident on the portable electronic host device;
        check whether an expansion user interface functionality provided by the functional expansion module is applicable to one or more of the host device applications;
        search, with respect to each applicable host device application, for modes and user interfaces needed for use in implementing the expansion functionality through that application; and
        define a vocabulary of correspondence between a minimum of expanded user interface functions provided by the functional expansion module and a minimum of user interface functions demanded by the host device; and
    wherein the portable electronic host device includes a memory for storing those necessary procedures for subsequent use in connection with a later detected interconnection of that functional expansion module so as to obviate the need to interface at each detected interconnection in order to set that functional expansion module for use by the portable electronic host device.

6. The apparatus of claim 5 wherein the necessary procedures comprise certain procedures implemented in order to activate the functional expansion module and set up the function expansion module for use in cooperation with the host device.

7. The method of claim 5 wherein the modes needed for use comprise listing user interface commands for resident applications that can be extended to the expanded user interface operation of the functional expansion module.

8. The apparatus of claim 5 wherein the modes needed for use comprise the implementation of fresh resources by the host device to support operation of the functional expansion module.

* * * * *